May 4, 1943.  H. L. OWEN  2,318,413
GABLE TRIM SHINGLE UNIT
Filed Oct. 20, 1941  2 Sheets-Sheet 1
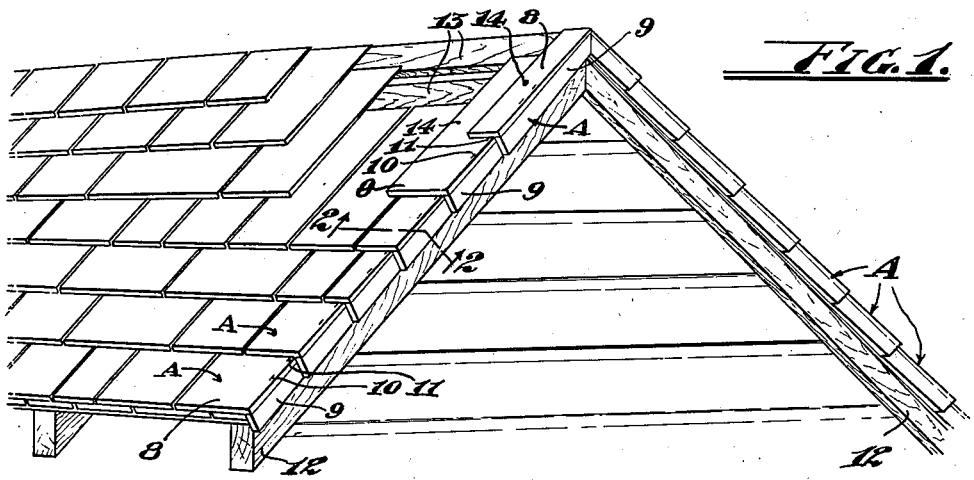
Inventor
Herbert L. Owen
By R. S. Berry
Attorney May 4, 1943.　　　H. L. OWEN　　　2,318,413
GABLE TRIM SHINGLE UNIT
Filed Oct. 20, 1941　　　2 Sheets-Sheet 2
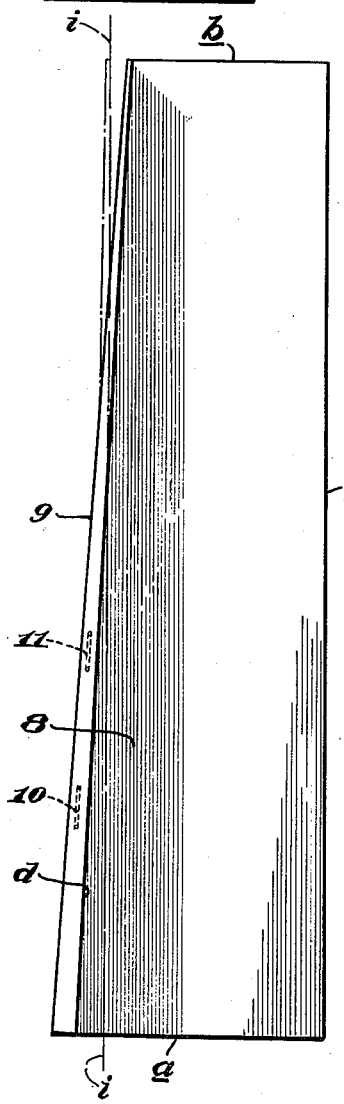
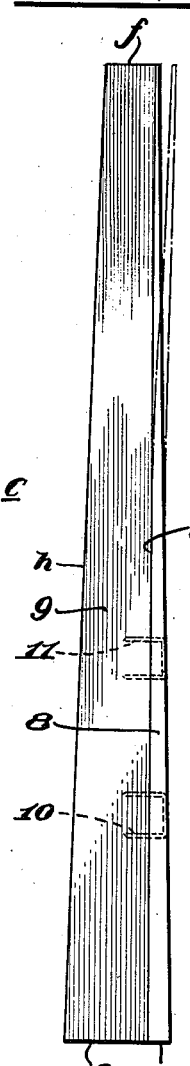
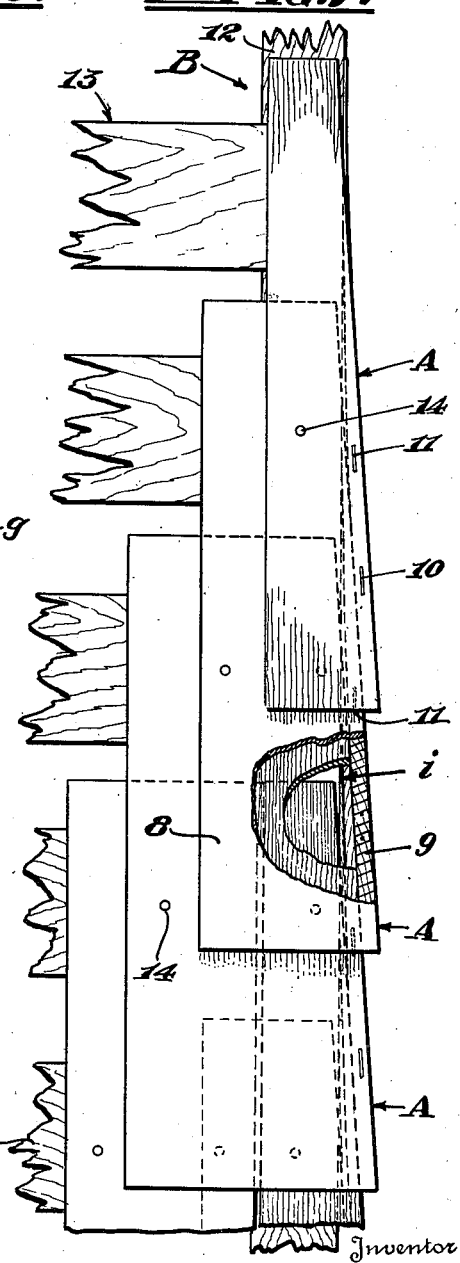
Inventor
Herbert L. Owen
By R. S. Berry
Attorney Patented May 4, 1943

2,318,413

UNITED STATES PATENT OFFICE 2,318,413

GABLE TRIM SHINGLE UNIT

Herbert L. Owen, Los Angeles, Calif.

Application October 20, 1941, Serial No. 415,761

6 Claims. (Cl. 108—26)

This invention relates to shingles and has as its primary object the provision of a preformed shingle unit for finishing and trimming the inclined edges or rakes of roofs and whereby the use of varge board or rake moldings as now commonly employed may be dispensed with and a highly ornamental and distinctive appearance be imparted to the finished rake.

Another object is to provide a rake trimming shingle unit composed of a pair of ordinary longitudinally tapered wooden shingles united together edge to edge in angular relation to each other in a fashion similar to that set forth in Letters Patent of the United States Number 2,259,962, granted to me and bearing issue date of October 21, 1941, but which rake unit is characterized by one of the shingles of the pair being adapted to lie on the field of the roof and arranged to constitute an end shingle at the rake thereof, while the other shingle of the pair constitutes an apron shingle adapted to depend from the rake and to be imposed on the front face thereof, the rake unit being further characterized by the formation of the field shingle of the unit with a transverse taper from its butt to its tip and with the reduced end portion thereof unattached to the apron shingle so that on laying a series of the units in longitudinally overlapped relation with each superimposed shingle arranged with its butt end longitudinally spaced from the butt end of the shingle therebeneath and extending perpendicular to the rake of the roof, a series of applied units will properly fit along the rake and each assembled unit will extend in conformity to the pitch or taper of both the field and apron shingles of the adjacent unit.

A particular advantage obtained by the invention is the facility with which the rake of a shingled roof may be finished with a consequent saving in time and labor on the part of the shingler.

Another advantage is the employment in the manufacture of the rake units, of narrow shingles of widths of three inches and less and as little as one inch as to the apron shingles of the units, which narrow shingles are ordinarily not suitable for use in general shingling operations and are ordinarily considered as waste and without commercial value, such narrow shingles being usually thrown away by shinglers and discarded and used for fuel by the shingle manufacturer, and for which reason the units may be readily produced at small cost.

With the foregoing objects and advantages in view together with such others as may subsequently appear the invention is carried into effect as hereinafter described and claimed and illustrated by way of example in the accompanying drawings in which:

Fig. 1 is a perspective view showing the invention as applied to the rakes of a gable roof:

Fig. 2 is a detail in cross section taken on the line 2—2 of Fig. 1:

Fig. 3 is a view in front elevation with portions broken away of a fragmentary portion of the finished rake:

Fig. 4 is a perspective view of the rake unit showing it as detached:

Fig. 5 is a view in elevation of the rake unit as seen from the inside of the field shingle thereof:

Fig. 6 is a view in elevation of the rake unit as seen from the inside of the apron shingle thereof:

Fig. 7 is a plan view with portions broken away showing a series of the rake units as applied to a roof structure.

Referring to the drawings more specifically A indicates generally the rake unit consisting of a pair of shingles which comprise a field shingle 8 and an apron shingle 9 which pair of shingles are arranged edge to edge in perpendicular relation to each other with their butt ends aligned and with one margin of the field shingle 8 overlying and abutting the adjacent edge of the apron shingle throughout at least a portion of the length of the latter. The shingles 8 and 9 preferably comprise the ordinary wood shingles of commerce which are tapered in thickness from the butt ends thereof to their tips. In forming the unit A the shingles 8 and 9 are fastened together at the butt end portions thereof by any suitable fastening means, here shown as comprising a pair of wire staples 10 and 11 which are driven through the field shingle 8 and penetrate the edge of the apron shingle 9 as particularly shown in Fig. 4. The shingles may thus be fastened together only at the butt portions thereof and are unattached to each other throughout the major portion of the reduced end portions thereof.

In carrying out the present invention the field shingle 8 is tapered transversely from its butt end $a$ to its reduced end $b$ and is formed with its free margin $c$ extending perpendicular to the ends $a$ and $b$ while its attached edge $d$ is inclined from the butt end $a$ toward the free margin $c$ as particularly shown in Fig. 5. Likewise the apron shingle 9 is formed with a thickened butt end $e$ and a thin end $f$ but has its attached edge $g$ perpendicular to the ends $e$ and $f$ while its free edge $h$ is inclined inwardly from the butt end $e$ toward the attached edge $g$.

The units thus formed are applied to the rake of a roof structure B as shown in Fig. 7 the rake line of which is indicated at $i$ and which line constitutes the outer edge of the roof above the varge board 12, as indicated in Fig. 2.

In applying the units they are arranged in a series along the rake $i$ with the field shingles 8 laid on the field or sheathing portion 13 of the roof structure B and fastened thereto by nails 14, the units being thus positioned with the apron shingle 8 depending below the rake line $i$ and thus covering the rake line and overlying the edge of the field structure 13. The apron shingles may be nailed to the varge board 12 if so desired.

By forming the field and apron shingles 8 and 9 with the transverse longitudinal tapers the superimposed shingle units will readily conform to the units therebeneath, the free ends of the shingles 8 and 9 being sprung away from each other on bending the shingles to fit and compensate for the tapers of the shingles therebeneath. The transverse taper of the field shingle 8 from its butt end to its reduced end is such that when the unit is applied to the rake of a roof the unattached margin of the field shingle will extend substantially perpendicular to the eave of the roof so as to extend at least approximately parallel to the edge of an adjacent shingle to be thereafter applied to the field of the roof. This transverse taper of the field shingle 8 is desirable, though not necessarily essential, by reason of the fact that when the gable unit is applied to the rake of a roof it will extend slightly diagonal relative to the outer edge $i$ of the roof above the varge board 12, by reason of the tapering thickness of the overlying apron shingles 9.

The apron shingles are narrower than the field shingles and all the apron shingles of a series are preferably of corresponding widths, while the field shingles of a series vary in widths so as to break joints.

I claim:

1. A preformed shingle unit for finishing the rakes of shingle roofs comprising a pair of shingles arranged edge to edge in perpendicular relation to each other with a longitudinal marginal portion of one of the shingles overlying the adjacent longitudinal edge of the other shingle and abutting the latter for at least a portion of the length thereof, and means fastening only the butt end portions of said shingles together, one of said shingles constituting a field shingle for application to and to constitute an exposed part of the field of a roof at the rake thereof, and the other of said shingles constituting an apron shingle for application to the end of a roof to depend from the rake thereof; the field shingle having its longitudinal free edge extending perpendicular to its butt edge and its other edge longitudinally inclined from the butt edge toward the free edge.

2. A preformed shingle unit for finishing the rakes of shingle roofs comprising a pair of shingles arranged edge to edge in perpendicular relation to each other with a longitudinal marginal portion of one of the shingles overlying the adjacent longitudinal edge of the other shingle and abutting the latter for at least a portion of the length thereof, and means fastening only the butt end portions of said shingles together, one of said shingles constituting a field shingle for application to and to constitute an exposed part of the field of a roof at the rake thereof, and the other of said shingles constituting an apron shingle for application to the end of a roof to depend from the rake thereof the apron shingle having its butt edge and its attached edge perpendicular to each other, and its other edge longitudinally inclined from the butt edge toward its attached edge.

3. A preformed shingle unit for finishing the rakes of shingle roofs comprising a pair of shingles arranged edge to edge in perpendicular relation to each other with a longitudinal marginal portion of one of the shingles overlying the adjacent longitudinal edge of the other shingle and abutting the latter for at least a portion of the length thereof, and means fastening only the butt end portions of said shingles together, one of said shingles constituting a field shingle for application to and to constitute an exposed part of the field of a roof at the rake thereof, and the other of said shingles constituting an apron shingle for application to the end of the roof to depend from the rake thereof, the outer free longitudinal edge of the field shingle and the attached edge of the apron shingle extending in parallel relation to each other, while the attached margin of the field shingle and the free margins of the apron shingle incline longitudinally from their butt ends toward their other edges.

4. As an article of manufacture, a preformed gable shingle unit comprising a field shingle and an apron shingle longitudinally tapered from their butts to their tips both transversely and in thickness, said shingles being arranged edge to edge perpendicular to each other with a marginal portion of the field shingle overlying and abutting at least a portion of the contiguous longitudinal edges of the apron shingle, and fastening means connecting only the butt end portions of the shingles.

5. The structure called for in claim 4 in which the apron shingle is narrower than the field shingle and is adapted to over-hang the rake of a roof to which the field shingle is applied.

6. In a shingle roof construction embodying a shingle receiving field having a rake, a series of preformed shingle units arranged along the rake in overlapped relation to each other, each of said units comprising a field shingle and an apron shingle affixed to a margin of the field shingle and depending therefrom to overhang the rake, and means fastening the field shingles to the field of the roof.

HERBERT L. OWEN.